(12) United States Patent
Fujino

(10) Patent No.: US 12,515,550 B2
(45) Date of Patent: Jan. 6, 2026

(54) CHARGING DEVICE

(71) Applicant: SUBARU CORPORATION, Tokyo (JP)

(72) Inventor: Takahito Fujino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 679 days.

(21) Appl. No.: 17/960,985

(22) Filed: Oct. 6, 2022

(65) Prior Publication Data

US 2023/0123530 A1    Apr. 20, 2023

(30) Foreign Application Priority Data

Oct. 14, 2021   (JP) ................................. 2021-168513

(51) Int. Cl.
*B60L 53/62*      (2019.01)
*B60L 53/16*      (2019.01)
(Continued)

(52) U.S. Cl.
CPC ............... *B60L 53/62* (2019.02); *B60L 53/16* (2019.02); *B60L 58/12* (2019.02); *H02J 7/00* (2013.01);
(Continued)

(58) Field of Classification Search
CPC .......... B60L 53/62; B60L 53/16; B60L 58/12; B60L 2240/545; B60L 2240/547;
(Continued)

(56) References Cited

U.S. PATENT DOCUMENTS

2018/0313906 A1   11/2018  Takahashi et al.
2019/0207406 A1*   7/2019  Matthey ............... H02J 7/00309
(Continued)

FOREIGN PATENT DOCUMENTS

JP      H06-138195 A      5/1994
JP      H07-336908 A     12/1995
(Continued)

OTHER PUBLICATIONS

Office Action issued in Japanese Patent Application No. 2021-168513 dated Jul. 1, 2025, (including English translation).

*Primary Examiner* — Julian D Huffman
*Assistant Examiner* — Nathan J Instone
(74) *Attorney, Agent, or Firm* — TROUTMAN PEPPER LOCKE LLP

(57) ABSTRACT

A charging device includes a charging port, an onboard battery, and a control device. The charging port can be electrically coupled to an external power source. The onboard battery can be electrically coupled to the charging port. The control device is configured to charge the onboard battery with power supplied through the charging port. The control device includes one or more processors and one or more memories. The one or more processors are configured to execute a process including suspending the charging of the onboard battery at a prescribed timing during the charging of the onboard battery, discharging at least some of the power in the onboard battery from the onboard battery when the charging of the onboard battery is suspended, measuring a voltage of the onboard battery after the discharging, and deriving a state of charge of the onboard battery, based on the measured voltage of the onboard battery.

4 Claims, 11 Drawing Sheets

(51) Int. Cl.
  *B60L 58/12* (2019.01)
  *H02J 7/00* (2006.01)
(52) U.S. Cl.
  CPC ........ *H02J 7/0048* (2020.01); *H02J 7/00712* (2020.01); *H02J 7/007194* (2020.01); *B60L 2240/545* (2013.01); *B60L 2240/547* (2013.01); *H02J 2310/48* (2020.01); *Y02T 10/7072* (2013.01); *Y02T 90/14* (2013.01)
(58) Field of Classification Search
  CPC ........ H02J 7/00; H02J 7/0048; H02J 7/00712; H02J 7/007194; H02J 2310/48; Y02T 10/7072; Y02T 90/14
  USPC ................ 320/109, 127, 128, 132, 133, 134
  See application file for complete search history.

(56) References Cited

U.S. PATENT DOCUMENTS

| | | | | |
|---|---|---|---|---|
| 2020/0341072 A1* | 10/2020 | Nakamoto | ........... | G01R 31/378 |
| 2021/0265856 A1* | 8/2021 | Nishikawa | ............ | H01M 10/44 |
| 2023/0095453 A1* | 3/2023 | Du | .................... | G01R 31/3842 |
| | | | | 324/432 |

FOREIGN PATENT DOCUMENTS

| | | | |
|---|---|---|---|
| JP | H11-509078 A | 8/1999 |
| JP | 2016-045025 A | 4/2016 |
| JP | 2018-185259 A | 11/2018 |
| WO | 97-03489 A1 | 1/1997 |

\* cited by examiner

CHARGING DEVICE

CROSS-REFERENCE TO RELATED APPLICATION

The present application claims priority from Japanese Patent Application No. 2021-168513 filed on Oct. 14, 2021, the entire contents of which are hereby incorporated by reference.

BACKGROUND

The disclosure relates to a charging device.

For example, Japanese Unexamined Patent Application Publication (JP-A) No. 2018-185259 discloses a technology related to controlling the charging of an onboard battery. JP-A No. 2018-185259 indicates that when charging an onboard battery, polarization occurs inside the onboard battery.

SUMMARY

An aspect of the disclosure provides a charging device to be applied to a vehicle. The charging device includes a charging port, an onboard battery, and a control device. The charging port is configured to be electrically coupled to a power source external to the vehicle. The onboard battery is configured to be electrically coupled to the charging port. The control device is configured to perform charging of the onboard battery with power supplied through the charging port. The control device includes one or more processors and one or more memories coupled to the one or more processors. The one or more processors are configured to execute a process. The process includes suspending the charging of the onboard battery at a prescribed timing during the charging of the onboard battery. The process includes discharging at least some of the power in the onboard battery from the onboard battery when the charging of the onboard battery is suspended. The process includes measuring a voltage of the onboard battery after the discharging of the onboard battery. The process includes deriving a state of charge of the onboard battery, based on the measured voltage of the onboard battery.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

A state of charge (SOC) of an onboard battery is derived based on, for example, a measurement value of the voltage of the onboard battery. However, if the polarization occurs in the onboard battery, error may occur between the actual SOC and the SOC derived based on the measurement value of the voltage.

It is desirable to provide a charging apparatus capable of reducing error in the SOC during charging.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
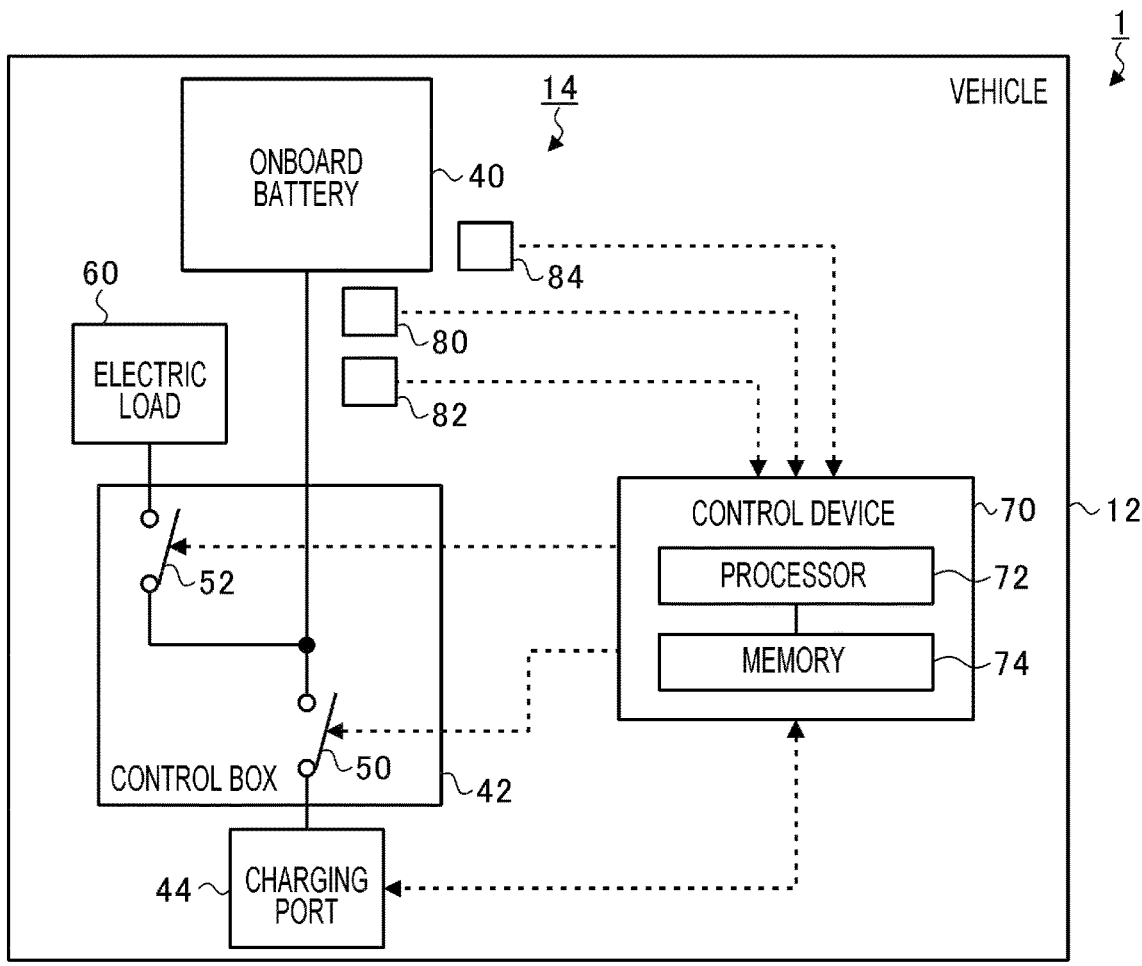
FIG. 1 is a schematic diagram illustrating a configuration of a charging system according to an embodiment.
Figure 1:
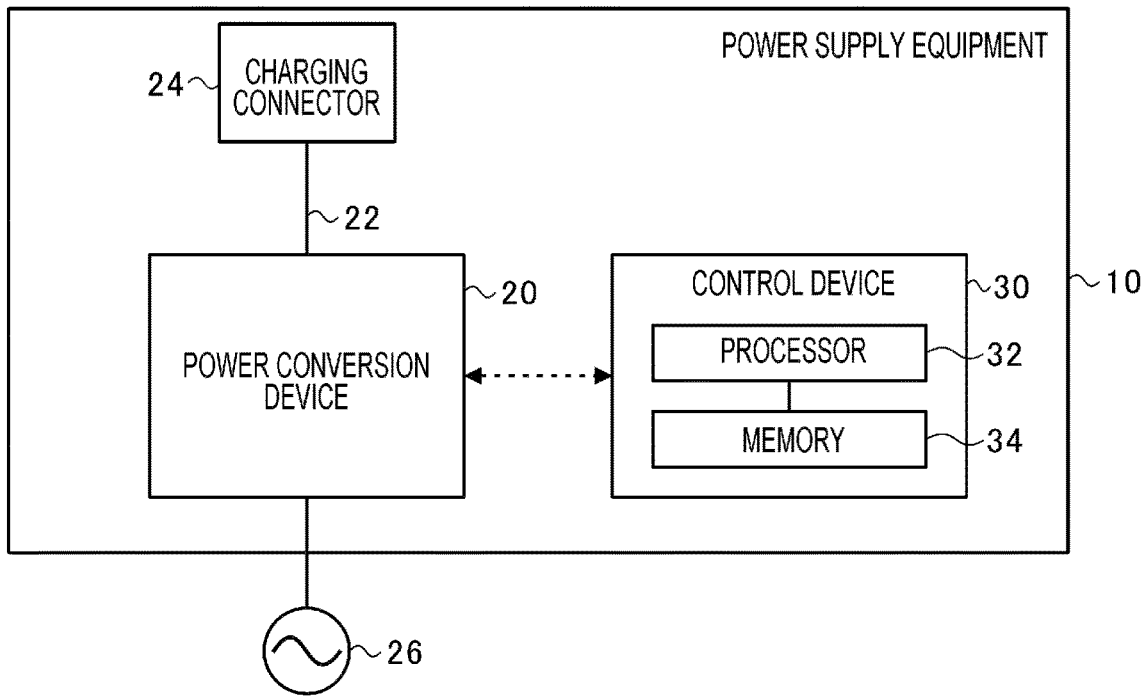

FIG. 1 is a schematic diagram illustrating a configuration of a charging system 1 according to the embodiment. The charging system 1 includes power supply equipment 10 and a vehicle 12. The vehicle 12 is an electric car or a hybrid car. A charging device 14 according to the embodiment is applied to the vehicle 12 and achieves charging of an onboard battery 40 described later.

The power supply equipment 10 includes a power conversion device 20, a charging cable 22, and a charging connector 24. The power conversion device 20 is electrically coupled to an electric power system 26. The electric power system 26 is an example of a power source external to the vehicle 12. Of the two ends of the charging cable 22, a first end is coupled to the power conversion device 20. The charging connector 24 is provided on the second end of the two ends of the charging cable 22. The charging connector 24 is described later. The charging connector 24 can be coupled to a charging port 44 of the vehicle 12.

The power conversion device 20 converts power supplied from the electric power system 26 and supplies converted power to the charging connector 24. In the state with the charging connector 24 coupled to the charging port 44, the power conversion device 20 can supply power to the vehicle 12 through the charging connector 24. For example, the power conversion device 20 converts commercial AC power from the electric power system 26 into DC power, and supplies the DC power to the vehicle 12. Note that the power conversion device 20 may also convert commercial AC power from an electric power system into AC power of a prescribed frequency, and supply the converted AC power to the vehicle 12. In this case, the vehicle 12 may be provided with a device that converts the supplied AC power into DC power. Also, in the state with the charging connector 24 coupled to the charging port 44, the power conversion device 20 can receive power from the vehicle 12 through the charging connector 24. The power conversion device 20 can convert power received from the vehicle 12 and supply the converted power to the electric power system 26.

The power supply equipment 10 includes a control device 30. The control device 30 includes one or more processors 32 and one or more memories 34 coupled to the one or more processors 32. Each memory 34 includes ROM in which programs and the like are stored, and RAM which is a work area. Each processor 32 of the control device 30 cooperates with a program included in the memory 34 to control the power supply equipment 10 as a whole. For example, the processor 32 executes a process for controlling the power conversion device 20. The control device 30 can also communicate with the vehicle 12 through the charging cable 22 and the charging connector 24. The control device 30 can control the power conversion device 20 in accordance with various information received from the vehicle 12.

The vehicle 12 includes an onboard battery 40. The onboard battery 40 is a secondary battery such as a lithium-ion battery, for example. The onboard battery 40 supplies power to a motor-generator which is the driving source of the vehicle 12. The motor-generator drives the wheels of the vehicle 12. The motor-generator also generates power when the vehicle 12 decelerates. The onboard battery 40 is charged with power generated by the motor-generator.

The vehicle 12 includes a control box 42 and the charging port 44. The charging port 44 can be coupled to the charging connector 24. The control box 42 includes a first switch 50 and a second switch 52. The first switch 50 and the second switch 52 are switches that can be used to turn an electrical connection on or off, such as a two-way switch, a relay, or a semiconductor switch, for example.

A first contact of the first switch 50 is coupled to an input-output terminal of the onboard battery 40. A second contact of the first switch 50 is coupled to the charging port 44. The first switch 50 is used to turn on or off the electrical connection between the charging port 44 and the onboard battery 40.

If the charging connector 24 is coupled to the charging port 44, the vehicle 12 can receive power from the electric power system 26 through the power supply equipment 10. In this state, if the first switch 50 is switched on, received power is supplied to the onboard battery 40 through the charging port 44 and the first switch 50, and the onboard battery 40 is charged.

A first contact of the second switch 52 is coupled to each of an input-output terminal of the onboard battery 40 and the first contact of the first switch 50 coupled to the onboard battery 40. A second contact of the second switch 52 is coupled to an electric load 60 mounted in the vehicle 12. The electric load 60 is any of various types of electric equipment, such as an in-vehicle air conditioner or a DC/DC converter, for example. Note that the electric load 60 is not limited to the electric equipment indicated above as examples, and may be any electric equipment mounted in the vehicle 12. Moreover, the electric load 60 is not limited to a single load and may be multiple loads. The second switch 52 is used to turn on or off the electrical connection between the onboard battery 40 and the electric load 60.

If the first switch 50 is switched off and the second switch 52 is switched on, the onboard battery 40 supplies power to the electric load 60 through the second switch 52. In other words, the electric load 60 consumes power discharged from the onboard battery 40.

If both the first switch 50 and the second switch 52 are switched off, the onboard battery 40 is put into a disconnected state. A disconnected state refers to a state of zero current at the input-output terminal of the onboard battery 40, in which no current flows out from the onboard battery 40 and no current flows into the onboard battery 40.

The vehicle 12 includes a control device 70. The control device 70 includes one or more processors 72 and one or more memories 74 coupled to the one or more processors 72. Each memory 74 includes ROM in which programs and the like are stored, and RAM which is a work area. Each processor 72 of the control device 70 cooperates with a program included in the memory 74 to control the vehicle 12 as a whole. For example, the processor 72 executes a process related to charging the onboard battery 40 with power received from the power supply equipment 10. The control device 70 can communicate with the power supply equipment 10 through the charging port 44. By communicating with the control device 30 of the power supply equipment 10, the control device 70 can indirectly control the power conversion device 20 via the control device 30. In other words, the control device 70 can substantially control the charging of the onboard battery 40 by the power supply equipment 10. Also, the control device 70 can control the switching on and off of the first switch 50 and the second switch 52. A process executed by the processor 72 of the control device 70 will be described in detail later.

The vehicle 12 includes a voltage sensor 80, a current sensor 82, and a temperature sensor 84. The voltage sensor 80 detects the voltage at the input-output terminal of the onboard battery 40. The current sensor 82 detects the current at the input-output terminal of the onboard battery 40. The temperature sensor 84 detects the temperature of the onboard battery 40.

Figure 2:
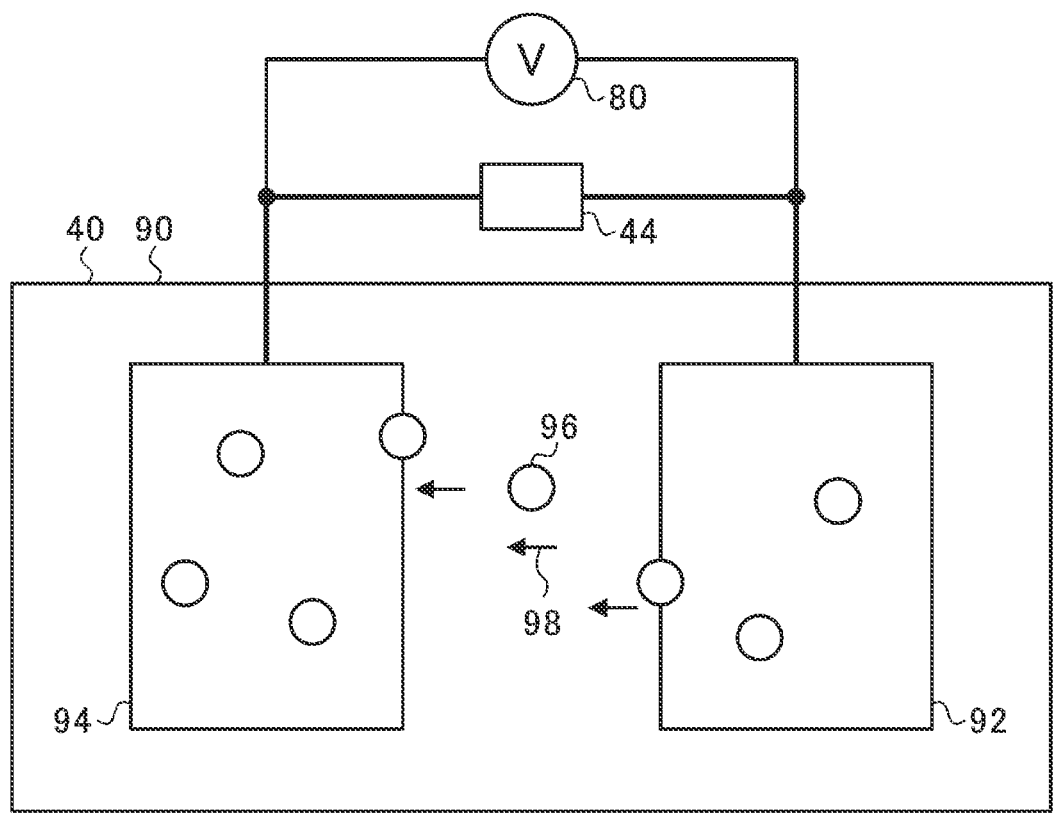
FIG. 2 is a diagram illustrating an example of the behavior of an onboard battery immediately after charging begins.

FIG. 2 is a diagram illustrating an example of the behavior of the onboard battery 40 immediately after charging begins. The onboard battery 40 includes a housing 90, a positive electrode member 92, and a negative electrode member 94. The positive electrode member 92 and the negative electrode member 94 are housed inside the housing 90. Additionally, an electrolytic solution is contained inside the housing 90.

The positive electrode member 92 is electrically coupled to the positive electrode terminal of the charging port 44 through the input-output terminal of the onboard battery 40. The negative electrode member 94 is electrically coupled to the negative electrode terminal of the charging port 44 through the input-output terminal of the onboard battery 40. Note that the first switch 50 is omitted from FIG. 2. If the charging port 44 is coupled to the charging connector 24, the positive and negative electrode terminals of the charging port 44 are each coupled through power supply equipment 10 to the electric power system 26 which acts as a power source. In other words, a charge current for charging the onboard battery 40 flows through the charging port 44 to the positive electrode member 92 and the negative electrode member 94 of the onboard battery 40.

The circles 96 in FIG. 2 represent electrons inside the onboard battery 40, and the arrows 98 in FIG. 2 represent the direction of electron movement. If a charge current flows to the onboard battery 40, electrons inside the positive electrode member 92 flow out into the electrolytic solution. Electrons in the electrolytic solution move toward the negative electrode member 94. Electrons reaching the negative electrode member 94 enter the negative electrode member 94. Electrons inside the negative electrode member 94 move to the positive electrode member 92 through the input-output terminal on the negative side of the onboard battery 40, the charging port 44 coupled to the power source, and the input-output terminal on the positive side of the onboard battery 40. The onboard battery 40 is charged by such electron movement.

The voltage sensor 80 is coupled between the input-output terminal on the negative side of the onboard battery 40 and the input-output terminal on the positive side of the onboard battery 40. The voltage sensor 80 measures the voltage between the input-output terminals on the negative and positive sides. Hereinafter, the voltage measured by the voltage sensor 80 may be referred to as the measurement voltage in some cases.

Immediately after charging begins, electrons in the onboard battery 40 move smoothly without delay, as illustrated in FIG. 2. In the state with electrons moving smoothly inside the onboard battery 40 in this way, the voltage between the negative electrode member 94 and the positive electrode member 92 of the onboard battery 40 can be measured appropriately by the voltage sensor 80.

Figure 3:
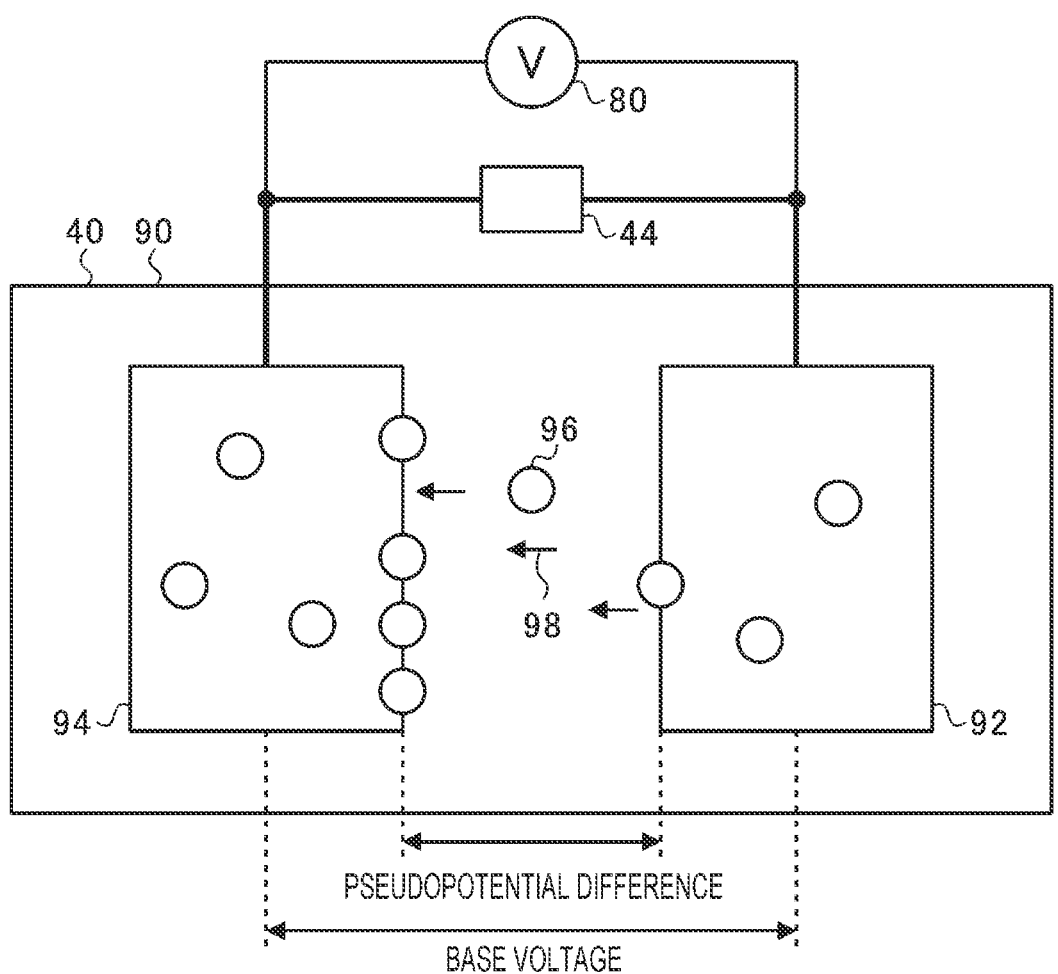
FIG. 3 is a diagram illustrating an example of the behavior of an onboard battery during charging.

FIG. 3 is a diagram illustrating an example of the behavior of the onboard battery 40 during charging. As time passes from the beginning of charging, as illustrated in FIG. 3, electrons do not fully enter the negative electrode member 94, and an electron imbalance occurs in which electrons build up on the surface layer of the negative electrode member 94. If such an electron imbalance occurs, the potential at the surface layer of the negative electrode member 94 falls due to the build-up of electrons on the surface layer of the negative electrode member 94. As a consequence, a pseudo-difference of electric potential occurs between the surface layer of the positive electrode member 92 and the surface layer of the negative electrode member 94. Hereinafter, the pseudo-difference of electric potential caused by such an electron imbalance may be referred to as the pseudopotential difference in some cases. The phenomenon whereby such a pseudopotential difference occurs may be referred to as polarization in some cases.

From the above, the pseudopotential difference may be referred to as the polarization voltage in some cases. Also, the pseudopotential difference is more pronounced with an increasingly larger charge current during charging.

In consideration of the polarization described above, a theoretical formula for the measurement voltage in the onboard battery 40 is expressed by the following formula (1).

$$V = OCV - I \times R + Vy \quad \text{Formula (1)}$$

In formula (1), "V" is the measurement voltage, "OCV" is a base voltage, "I" is the current at the input-output terminal of the onboard battery 40, "R" is the internal resistance of the onboard battery 40, and "Vy" is the voltage due to polarization, that is, the pseudopotential difference. The base voltage is the original voltage between the negative electrode member 94 and the positive electrode member 92 when the onboard battery 40 is in the disconnected state. As indicated in formula (1) above, the measurement voltage is obtained by adding the pseudopotential difference to the base voltage.

Figure 4:
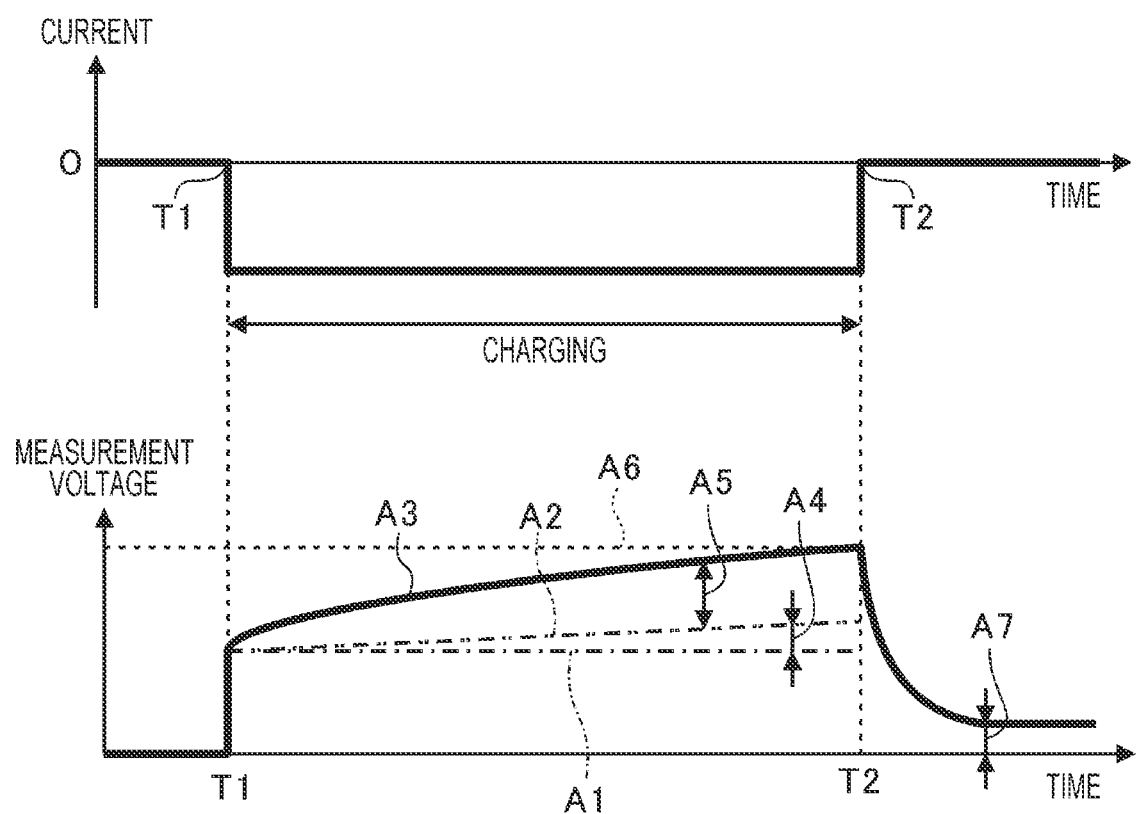
FIG. 4 is a diagram illustrating an example of the change over time in the current and the change over time in the measurement voltage when charging.

FIG. 4 is a diagram illustrating an example of the change over time in the current and the change over time in the measurement voltage when charging. For example, suppose that charging begins at a timing T1 and ends at a timing T2 in FIG. 4. Note that the discharge current flowing out from the onboard battery 40 is denoted as a positive value while the charge current flowing into the onboard battery 40 is denoted as a negative value.

The chain line A1 in FIG. 4 is an example of "−I×R" in formula (1) above. Note that since the charge current is denoted by a negative value, "−I×R" is a positive value. The chain double-dashed line A2 in FIG. 4 is an example of "OCV−I×R" in formula (1) above. The solid line A3 in FIG. 4 is an example of "OCV−I×R+Vy" in formula (1) above, or in other words, the measurement voltage V. Also, the arrow A4 which indicates the difference between the chain double-dashed line A2 and the chain line A1 corresponds to the base voltage "OCV". The arrow A5 which indicates the difference between the solid line A3 and the chain double-dashed line A2 corresponds to the pseudopotential difference "Vy".

If charging is performed with a constant current, a constant voltage according to the charge current is included in the measurement voltage, as indicated by the chain line A1. Since the charge current and the internal resistance are known values, it is easy to derive the voltage excluding the value of "−I×R" indicated by the chain line A1 from the measurement voltage.

As indicated by the chain double-dashed line A2, the base voltage rises gradually as charging continues. The rise in the base voltage corresponds to the actual voltage rise in the onboard battery 40 due to being charged.

Also, as indicated by the solid line A3, the pseudopotential difference also increases as charging continues. The rise in the pseudopotential difference in addition to the rise in the base voltage are added to the measurement voltage. At this point, suppose for example that charging is ended when the measurement voltage reaches a prescribed upper voltage limit indicated by the dashed line A6. Since the rise in the pseudopotential difference is also added to the measurement voltage as described above, even if the measurement voltage reaches the upper voltage limit, the actual voltage due to charging has not reached the upper voltage limit.

Moreover, if charging ends at the timing T2, the onboard battery 40 is put into the disconnected state. In the disconnected state, "−I×R" goes to zero. Also, if the disconnected state continues, the electron imbalance, or in other words the polarization, in the onboard battery 40 is gradually resolved. As a consequence, the pseudopotential difference decreases and the measurement voltage gradually falls, as indicated by the solid line A3 in FIG. 4. Furthermore, if the disconnected state continues longer, the polarization is resolved completely and the measurement voltage settles down to a constant value. As indicated by the arrow A7 in FIG. 4, the measurement voltage after settling down to a constant value corresponds to the increase in the base voltage from the beginning to the end of charging. The time until the measurement voltage settles down to a constant value may be 20 minutes, for example, but depends on factors such as the specifications of the onboard battery 40, the charge current applied during charging, and the temperature of the onboard battery 40.

During charging, the control device 70 successively acquires such a measurement voltage from the voltage sensor 80 and derives the SOC based on the acquired measurement voltage. The SOC is an indicator of the state of charge of the onboard battery 40, and expresses the present charge capacity as a percentage of the capacity at full charge, for example.

However, since the pseudopotential difference caused by polarization is included in the measurement voltage, the derived SOC contains error with respect to actual SOC. Moreover, since the pseudopotential difference is different depending on the charge current or the state of the onboard battery 40, such as the temperature of the onboard battery 40, for example, deriving the pseudopotential difference itself is difficult.

Figure 5:
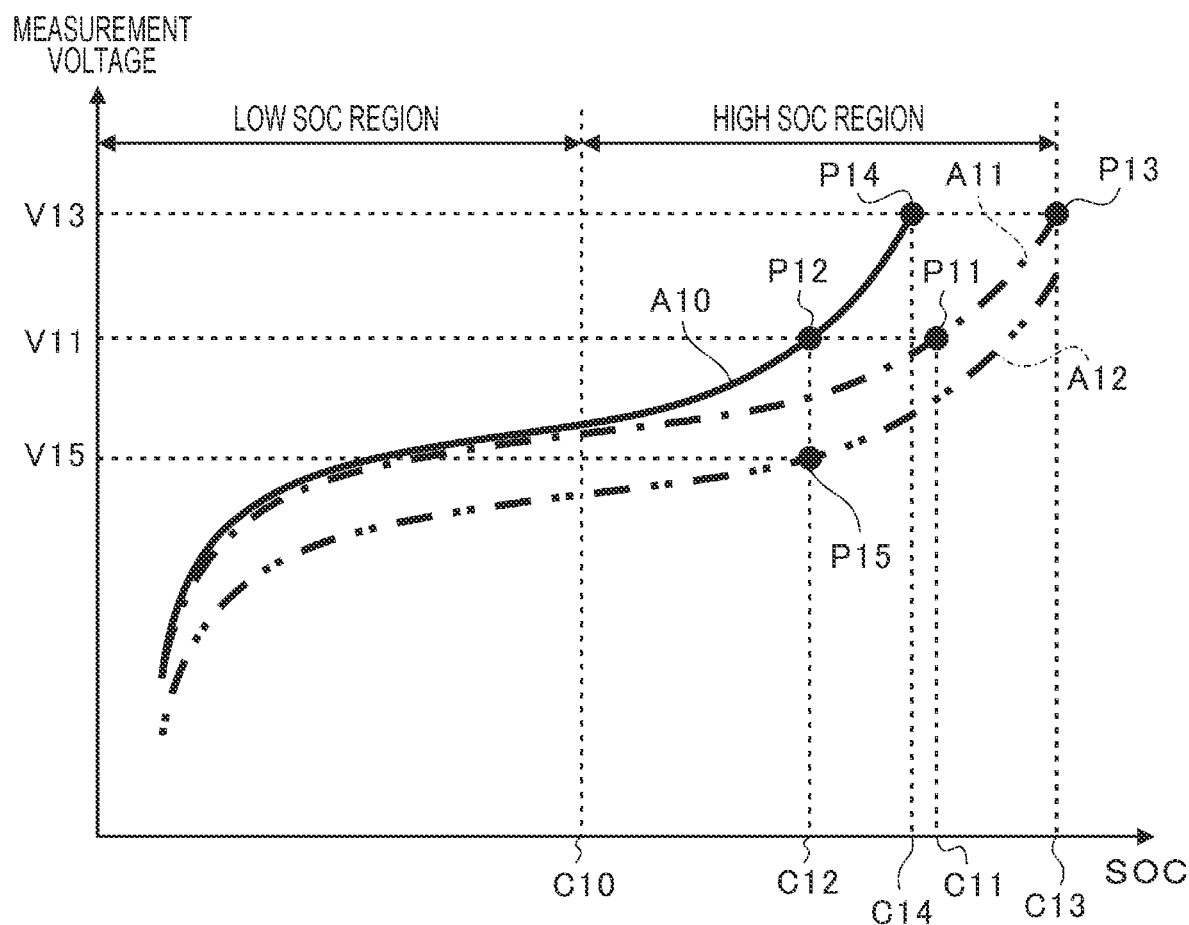
FIG. 5 is a diagram for describing an example of deriving the SOC from the measurement voltage.

FIG. 5 is a diagram for describing an example of deriving the SOC from the measurement voltage. In FIG. 5, the solid line A10 is a curve indicating the relationship between the measurement voltage and the SOC when a relatively large current is flowing into the onboard battery 40 and pronounced polarization is occurring. The chain line A11 is a curve indicating the relationship between the measurement voltage and the SOC when a tiny current is flowing into the onboard battery 40.

In other words, the chain line A11 corresponds to the case where the onboard battery 40 is in a connected state but polarization is not occurring, or even if polarization is occurring, the resulting pseudopotential difference is negligible. The chain double-dashed line A12 is a curve indicating the relationship between the measurement voltage and the SOC when polarization is not occurring in the onboard battery 40 and the onboard battery 40 is in the disconnected state. The solid line A10, the chain line A11, and the chain double-dashed line A12 indicate a general trend in which if the measurement voltage rises, the SOC also rises.

At least the curve of the chain double-dashed line A12 is stored in advance in the memory 74 of the control device 70. The curve of the chain line A11 is simply the curve of the chain double-dashed line A12 with the measurement voltage raised by "−I×R" in formula (1) above. For this reason, the curve of the chain line A11 can be derived based on the curve of the chain double-dashed line A12 stored in advance. Note that the curve of the chain line A11 may also be stored in the memory 74.

The solid line A10 corresponds to an example of the actual measurement voltage when charging. However, since the pseudopotential difference is included in the measurement voltage, it is difficult to prepare the curve of the solid line A10 itself in advance.

In addition, the SOC "C10" in FIG. 5 indicates a prescribed threshold value for the SOC. The threshold value divides the SOC into a low SOC region where the SOC is less than the threshold value and a high SOC region where the SOC is equal to or greater than the threshold value. In the low SOC region, the solid line A10 and the chain line A11 are approximately the same. In other words, in the low SOC region, polarization has little effect and the pseudopotential difference is relatively small. On the other hand, in the high SOC region, the difference between the solid line A10 and the chain line A11 is relatively large, and the SOC rises, the difference between the solid line A10 and the chain line A11 widens. In this way, the threshold value divides the SOC into a low SOC region where polarization has relatively small effects and a high SOC region where polarization has relatively large effects. The threshold value is set to 50%, for example, but depends on the charge current or the state of the onboard battery 40, such as the temperature of the onboard battery 40.

As described above, the control device 70 can ascertain the curve of the chain line A11 based on the chain double-dashed line A12 stored in advance, but cannot ascertain the curve of the solid line A10. Here, the present measurement voltage during charging is taken to be a measurement voltage V11, for example. In this case, the control device 70 derives the SOC "C11" corresponding to a point P11 on the ascertained curve of the chain line A11 where the measurement voltage is the measurement voltage V11 as the present SOC.

However, the pseudopotential difference is actually included in the measurement voltage V11. For this reason, the onboard battery 40 is charged up to an actual SOC "C12" corresponding to a point P12 on the curve of the solid line A10 where the measurement voltage is the measurement voltage V11. In this way, the effects of polarization produce error in the derived SOC, and even though the onboard battery 40 is actually charged up to the SOC "C12", the SOC is incorrectly determined as being the higher SOC "C11". Consequently, assuming that charging is ended at this time, the onboard battery 40 will be charged up to the actual SOC "C12".

Also, in the high SOC region, the effects of polarization are larger, and therefore the error in the derived SOC is larger compared to the low SOC region. If the error in the SOC is large, charging may end at a lower SOC than a target SOC.

For example, suppose that the control device 70 ends charging when the measurement voltage reaches a prescribed upper voltage limit, namely a measurement voltage V13. In this case, the control device 70 derives the SOC "C13" corresponding to a point P13 on the curve of the chain line A11 where the measurement voltage is the measurement voltage V13 as the present SOC. However, in actuality, the onboard battery 40 is charged up to an SOC "C14" corresponding to a point P14 on the curve of the solid line A10 where the measurement voltage is the measurement voltage V13. In this way, although the intention is to end charging at the SOC "C13", charging actually ends at SOC "C14" lower than the SOC "C13".

To keep the actual SOC from dropping after charging ends, the control device 70 may also perform topping charging after charging ends. To distinguish between topping charging and the charging performed before the topping charging, for convenience, the ordinary charging before the topping charging may be referred to as bulk charging in some cases. In topping charging, the absolute value of the charging current is smaller compared to bulk charging.

Figure 6:
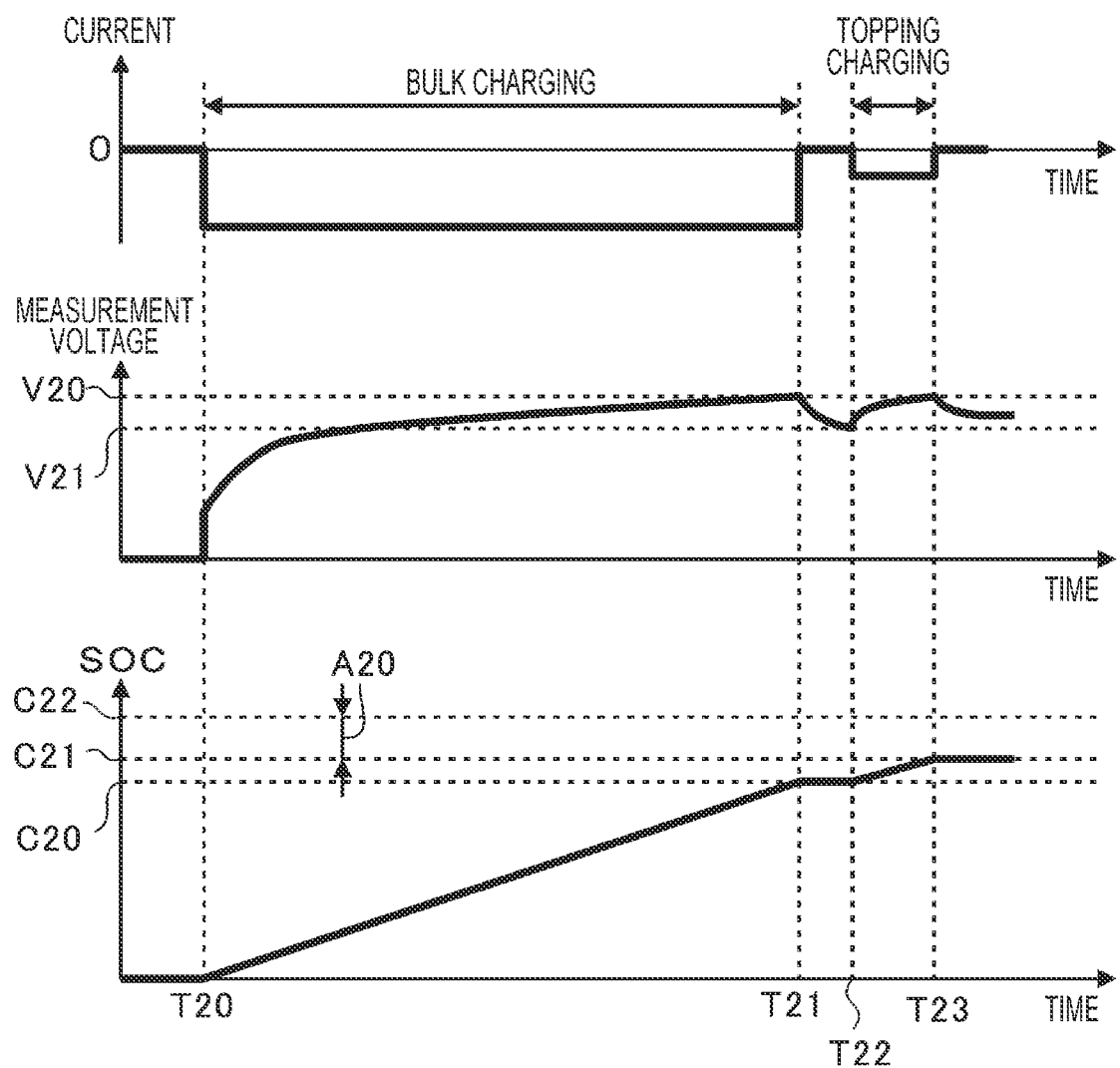
FIG. 6 is a diagram for describing topping charging.

FIG. 6 is a diagram for describing topping charging. In the example in FIG. 6, bulk charging starts at a timing T20, and bulk charging ends at a timing T21 when the measurement voltage reaches a prescribed upper voltage limit, namely a measurement voltage V20. When the bulk charging ends, the onboard battery 40 is put into the disconnected state from the timing T21 until a timing T22 a prescribed time later. In the disconnected state, polarization is gradually resolved, and the measurement voltage gradually falls as the polarization is resolved. For example, at the timing T22, the measurement voltage falls to a measurement voltage V21 lower than the measurement voltage V20. The prescribed time for maintaining the disconnected state is set to any time with consideration for the time it takes for polarization to resolve, the final end timing of charging after the topping charging, and the like.

Also, the actual SOC at the timing T21 when the bulk charging ends is assumed to be an SOC "C20", for example. While the disconnected state is maintained, the actual SOC generally stays at the SOC "C20".

When the timing T22 is reached after a prescribed time in the disconnected state elapses, the control device 70 starts the topping charging. In the topping charging, polarization may occur in a similar way as the bulk charging. When the topping charging is started, the measurement voltage rises in accordance with the current of the topping charging. As a consequence, the actual SOC also rises in accordance with the rise in the measurement voltage.

At a timing T23 when the measurement voltage reaches the measurement voltage V20 again, the control device 70 ends the topping charging and puts the onboard battery 40 into the disconnected state. As a consequence, the polarization that occurs during the topping charging is gradually resolved, and the measurement voltage gradually falls as the polarization is resolved. The measurement voltage settles down when the polarization is resolved.

The actual SOC at the timing T23 when the topping charging ends is, for example, a SOC "C21" higher than the SOC "C20" as a result of performing the topping charging. In this way, by performing the topping charging, the SOC after the end of overall charging, which includes the bulk charging and the topping charging, can be kept from falling below the target SOC.

However, even if the topping charging is performed, the measurement voltage still rises due to polarization during the bulk charging, and the measurement voltage still reaches the measurement voltage V20 early. Accordingly, there may be a large error between the SOC based on the measurement voltage and the actual SOC, and the bulk charging may be ended before the actual SOC is sufficiently high.

Also, the end timing for overall charging is delayed if the period of the disconnected state between the bulk charging and the topping charging is set to a long time, that is, until the polarization that occurs during the bulk charging is fully resolved. For this reason, in some cases, a short period of the disconnected state is set and the topping charging is performed while the polarization that occurs during the bulk charging is not fully resolved. As a consequence, the measurement voltage V20 may be reached early in the topping charging as well due to effects of polarization. In the above case, the topping charging may end before the SOC rises sufficiently, and the lowered SOC may not be suppressed adequately when charging ends. For example, as indicated by the arrow A20 in FIG. 6, the difference between the actual SOC "C21" and the SOC "C22" which is the target SOC at the end of the overall charging is not narrowed sufficiently.

In light of the above, the control device 70 according to the embodiment forcibly resolves polarization partway through the bulk charging to correct the measurement voltage to a measurement voltage in which the pseudopotential difference is resolved.

In one example, the control device 70 suspends charging at a prescribed timing during the bulk charging, and causes at least some of the power in the onboard battery 40 to be discharged while the charging is suspended. When discharging occurs in the onboard battery 40, electrons inside the onboard battery 40 move in the opposite direction compared to charging, and therefore the electron imbalance inside the onboard battery 40 is resolved. As a result, polarization can be resolved early and the pseudopotential difference can be reduced early.

After discharging, the control device 70 puts the onboard battery 40 into the disconnected state and measures the voltage in the disconnected state. Since the voltage is measured in a state with polarization resolved, the measurement voltage is corrected to the appropriate measurement voltage with substantially no pseudopotential difference. Note that the case where there is substantially no pseudopotential difference may include the case where the pseudopotential difference is small enough to be negligible.

Thereafter, the control device 70 derives the SOC based on the measurement voltage that is corrected as above. Since the corrected measurement voltage has substantially no pseudopotential difference, the SOC derived based on the measurement voltage is substantially equal to the actual SOC. For example, in the example in FIG. 5, suppose that the measurement voltage immediately before discharging is the measurement voltage V11. In this example, if discharging is performed and the voltage is measured in the disconnected state after discharging, a measurement voltage V15 lower than the measurement voltage V11 is acquired, for example. The control device 70 derives the SOC corresponding to a point P15 on the curve of the chain double-dashed line A12 related to the disconnected state where the measurement voltage is the measurement voltage V15 as the present SOC. In this way, the control device 70 can derive the SOC "C12" that is substantially equal to the actual SOC "C12" immediately before discharging. Consequently, the control device 70 can reduce the error in the SOC when charging.

Furthermore, since the measurement voltage is corrected partway through the bulk charging, the control device 70 can prevent the measurement voltage from becoming excessively high. Consequently, it is possible to avoid accelerating the time until the measurement voltage reaches the prescribed upper voltage limit. With this arrangement, the control device 70 can reduce the difference between the target SOC and the actual SOC at the end of the bulk charging.

Moreover, in addition to correcting the measurement voltage by causing a discharge, the control device 70 also performs topping charging after the bulk charging. Consequently, the control device 70 can further reduce the difference between the target SOC and the actual SOC at the end of the overall charging.

Figure 7:
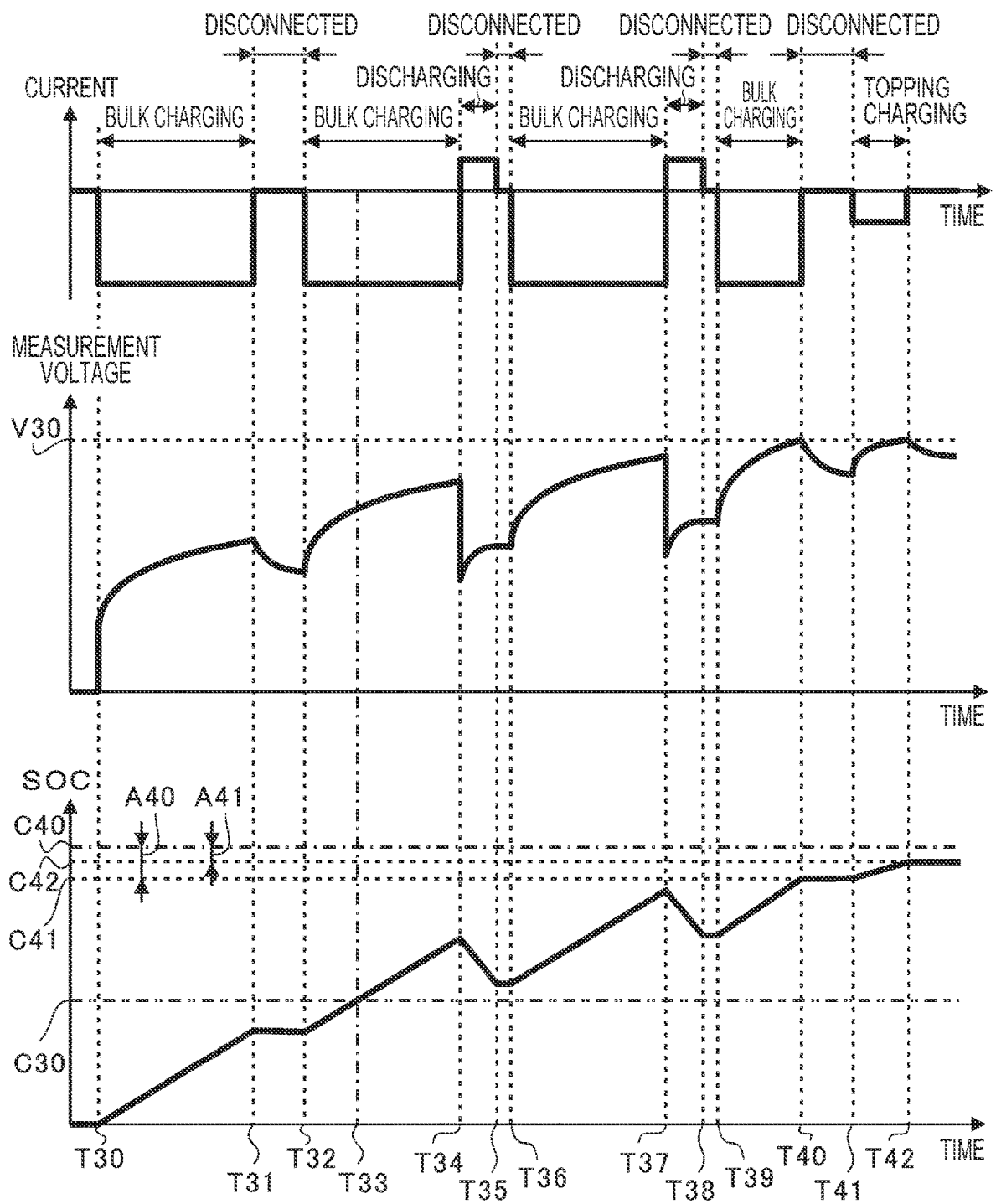
FIG. 7 is a time chart for describing an example of operations by a control device from the beginning to the end of charging.

FIG. 7 is a time chart for describing an example of operations by the control device 70 from the beginning to the end of charging. In the example in FIG. 7, the bulk charging is started at a timing T30. The initial SOC at the beginning of the bulk charging is lower than the SOC "C30" which is the threshold dividing the low and high SOC regions, and therefore the initial SOC belongs to the low SOC region.

Suppose that a prescribed suspend condition is satisfied at a timing T31 after the timing T30. The suspend condition is satisfied in the case where, for example, a cumulative charge current amount reaches a predetermined amount. The cumulative charge current amount is obtained by accumulating the charge current values in the period from the timing T30 to the timing T31 when the suspend condition is satisfied. At the timing T31 when the suspend condition is satisfied, the control device 70 briefly suspends the bulk charging.

Suppose that the SOC at the timing T31 when the suspend condition is satisfied is less than the threshold SOC "C30". In this case, the control device 70 puts the onboard battery 40 into the disconnected state and maintains the disconnected state for a prescribed time. With this arrangement, the pseudopotential difference occurring in the period from the timing T30 to the timing T31 is reduced. Note that the prescribed time may be set to any length of time in consideration of factors such as the cumulative charge current amount from the timing T30 to the timing T31.

At a timing T32 after maintaining the disconnected state for the prescribed time, the control device 70 measures the voltage of the onboard battery 40 and derives the SOC based on the obtained measurement voltage. Thereafter, the control device 70 resumes the bulk charging. When the bulk charging is resumed, the measurement voltage and the SOC rise.

Suppose that a prescribed suspend condition is satisfied at a timing T34 after the timing T32. The suspend condition is satisfied in the case where, for example, the cumulative charge current amount in the period from the timing T32 to the timing T34 reaches a predetermined amount. At the timing T34 when the suspend condition is satisfied, the control device 70 briefly suspends the bulk charging.

Here, a timing T33 between the timings T32 and T34 is the timing at which the SOC reaches the SOC "C30". Accordingly, the SOC at the timing T34 is equal to or greater than the SOC "C30". In this case, the control device 70 discharges at least some of the power in the onboard battery 40 at the timing T34. When discharging is performed, a discharge current flows through the onboard battery 40 in the opposite direction of the charge current, and therefore the measurement voltage drops rapidly. In addition, polarization is resolved quickly in a few seconds, for example, and the measurement voltage settles down.

When a cumulative discharge current amount obtained by accumulating the discharge current values over time reaches a prescribed target amount, the control device 70 ends the discharging. The discharge time until the cumulative discharge current amount reaches the target amount can be shortened markedly compared to a configuration that puts the onboard battery 40 in the disconnected state after charging. Also, when the onboard battery 40 is discharged, the SOC gradually decreases. However, since the discharge time is short, the amount by which the SOC decreases can be made sufficiently smaller than the amount by which the SOC is increased by the bulk charging.

At a timing T35 when the cumulative discharge current amount reaches the target amount, the control device 70 ends the discharging and puts the onboard battery 40 into the disconnected state. Thereafter, the control device 70 measures the voltage of the onboard battery 40 in the disconnected state. Since polarization is resolved during the discharging immediately before the voltage is measured, the control device 70 can acquire a corrected measurement voltage with substantially no pseudopotential difference. The control device 70 derives the SOC based on the corrected measurement voltage. With this arrangement, the corrected measurement voltage and SOC are obtained in the disconnected state between the timings T35 and T36. At a timing T36 after the derivation of the SOC, the control device 70 resumes the bulk charging.

Suppose that a prescribed suspend condition is satisfied at a timing T37 after the timing T36. The suspend condition is satisfied in the case where, for example, the cumulative charge current amount in the period from the timing T36 to the timing T37 reaches a predetermined value. At the timing when the suspend condition is satisfied, the control device 70 briefly suspends the bulk charging.

The SOC at the timing T37 is equal to or greater than the SOC "C30". For this reason, the control device 70 discharges at least some of the power in the onboard battery 40 at the timing T37, similarly to the situation at the timing T34.

At a timing T38 when the cumulative discharge current amount reaches the target amount, the control device 70 ends the discharging and puts the onboard battery 40 into the disconnected state. Thereafter, the control device 70 measures the voltage of the onboard battery 40 in the disconnected state. The control device 70 derives the SOC based on the acquired measurement voltage. With this arrangement, the corrected measurement voltage and SOC are obtained in the disconnected state between the timings T38 and T39. At a timing T39 after the derivation of the SOC, the control device 70 resumes the bulk charging.

Suppose that the measurement voltage reaches a measurement voltage V30 indicating the prescribed upper voltage limit at a timing T40 after the timing T39. In this case, the control device 70 ends the bulk charging and puts the onboard battery 40 into the disconnected state.

Since the measurement voltage is corrected to the appropriate value by the discharging partway through the bulk charging, the error between the SOC based on the measurement voltage and the actual SOC can be reduced. Moreover, it is possible to keep the measurement voltage from rising, and a result, keep the measurement voltage from reaching the measurement voltage V30 early. This arrangement makes it possible to keep the overall charging from ending before the actual SOC is sufficiently high. For example, as indicated by the arrow A40 in FIG. 7, the difference between the target SOC "C40" and the actual SOC "C41" at the end of the bulk charging can be reduced.

At a timing T41 after the disconnected state is maintained for a prescribed time, the control device 70 starts the topping charging. The control device 70 ends the topping charging at a timing T42 when the measurement voltage reaches the measurement voltage V30 again. At this point, the overall charging ends. By performing the topping charging, it is possible to further keep the overall charging from ending before the actual SOC is sufficiently high. For example, as indicated by the arrow A41 in FIG. 7, the difference between the target SOC "C40" and the actual SOC "C42" at the end of the topping charging can be reduced. Note that the topping charging may also be omitted.

Hereinafter, processes by the control device 70 for achieving the operations related to the charging and discharging above and functions for carrying each of the processes will be described. Note that the following describes processes related to charging and discharging as an example, and other processes are omitted from description.

Figure 8:
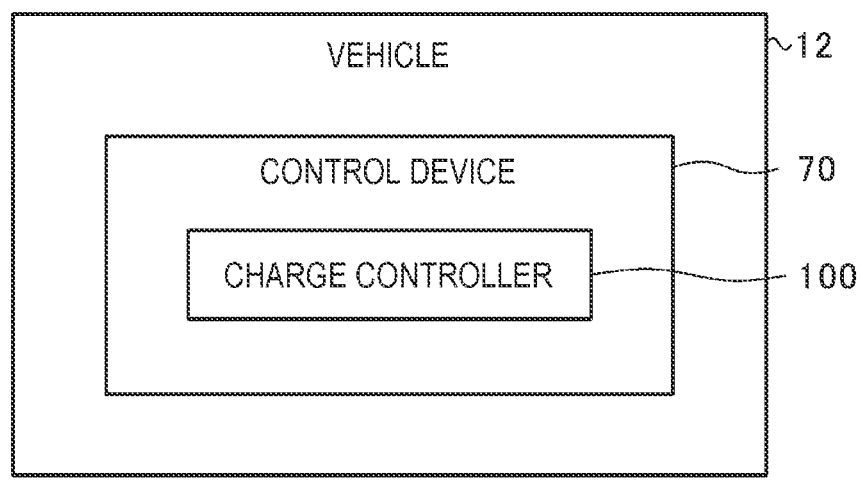
FIG. 8 is a function block diagram of the control device.

FIG. 8 is a function block diagram of the control device 70. The processor 72 of the control device 70 cooperates with a program included in the memory 74. In one embodiment, the processor 72 may serve as a "charge controller 100". Note that for convenience, the bulk charging described above may simply be referred to as the charging in some cases.

The charge controller 100 charges the onboard battery 40 with power supplied through the charging port 44 in the state with the charging connector 24 coupled to the charging port 44. In one example, the charge controller 100 switches off the second switch 52 and switches on the first switch 50 to supply power received from the power supply equipment 10 to the onboard battery 40.

The charge controller 100 suspends the charging of the onboard battery 40 at a prescribed timing during the charging of the onboard battery 40. In one example, the charge controller 100 switches off the first switch 50. When the charging of the onboard battery 40 is suspended, the charge controller 100 causes at least some of the power in the onboard battery 40 to be discharged from the onboard battery 40. In one example, the charge controller 100 switches on the second switch 52 while the first switch 50 is switched off. A current flows from the onboard battery 40 to the electric load 60 through the second switch 52, thereby discharging the onboard battery 40. Note that the amount of discharged power is assumed to be less than the amount of charged power.

After the discharging of the onboard battery 40, the charge controller 100 puts the onboard battery 40 into the disconnected state and uses the voltage sensor 80 to measure the voltage at the input-output terminal of the onboard battery 40. The charge controller 100 derives the SOC of the onboard battery 40, based on the measured voltage of the onboard battery 40. The charge controller 100 resumes the charging of the onboard battery 40 after measuring the voltage of the onboard battery 40. In one example, the charge controller 100 resumes the charging of the onboard battery 40 after the derivation of the SOC based on the measured voltage.

Herein, an indicator obtained by accumulating the charge current values of the onboard battery 40 over time may be referred to as the cumulative charge current amount in some cases. Also, the cumulative charge current amount in period from the beginning until the end of an inflow of a charge current when there is a continuous flow of the charge current may be referred to as the interval cumulative charge current amount. The interval cumulative charge current amount indicates the cumulative charge current amount in the period from the beginning of the charging until the charging is suspended, for example. Also, in the case where the charging is suspended multiple times, the interval cumulative charge current amount indicates the cumulative charge current amount in the period from the end of one suspension until the beginning of the next suspension, for example.

The charge controller 100 sets the timing for suspending charging, or in other words the charging suspend condition, based on the temperature of the onboard battery 40 at the beginning of the charging. The timing for suspending charging, that is, the charging suspend condition, is set to be when the interval cumulative charge current amount reaches a predetermined amount, for example.

Also, the temperature of the onboard battery 40 may be referred to as the battery temperature in some cases.

The lower the temperature of the onboard battery 40 at the beginning of the charging is, the earlier the charge controller 100 sets the timing for suspending charging, for example. Since the effects of polarization are larger at lower battery temperatures, the charge controller 100 suspends charging and performs discharging earlier for lower battery temperatures. With this arrangement, the measurement voltage can be corrected before the error in the measurement voltage becomes excessively large, and a reduction in the accuracy of the SOC can be suppressed.

The charge controller 100 repeatedly suspends charging and performs discharging in this way every time the charging suspend condition is satisfied. Since the measurement voltage is corrected every time the charging is suspended, a reduction in the accuracy of the SOC can be suppressed.

Herein, an indicator obtained by accumulating the discharge current values of the onboard battery 40 over time may be referred to as the cumulative discharge current amount in some cases. The charge controller 100 causes the discharging to be executed such that the actual cumulative discharge current amount due to the discharging is equal to or greater than a target amount for the cumulative discharge current amount.

The charge controller 100 derives the target amount for the cumulative discharge current amount of the onboard battery 40, based on the interval cumulative charge current amount immediately before the discharging begins and the temperature of the onboard battery 40 at the beginning of the discharging. The effects of polarization are larger for larger values of the interval cumulative charge current amount immediately before the discharging begins, and therefore the charge controller 100 sets a larger target amount for the cumulative discharge current amount with respect to a larger interval cumulative charge current amount immediately before the discharging begins. Also, as described above, since the effects of polarization are larger at lower battery temperatures, the charge controller 100 sets a larger target amount for the cumulative discharge current amount with respect to a lower temperature of the onboard battery 40 at the beginning of the discharging. For example, a cumulative discharge current amount setting map in which the interval cumulative charge current amount, the battery temperature, and cumulative discharge current amount are associated is stored in advance in the memory 74 of the control device 70. The charge controller 100 references the cumulative discharge current amount setting map, derives the cumulative discharge current amount from the interval cumulative charge current amount immediately before the discharging begins and the temperature of the onboard battery at the beginning of the discharging, and sets the derived cumulative discharge current amount as the target amount. With this arrangement, the discharging can be performed with an appropriate cumulative discharge current amount. Moreover, by performing the discharging until the actual cumulative discharge current amount reaches the target amount, an appropriate discharge time can be achieved.

The charge controller 100 successively derives the SOC of the onboard battery 40, based on the cumulative charge current amount during the charging. Additionally, the SOC is corrected by the SOC derived while the charging is suspended.

When the condition for suspending charging is satisfied, the charge controller 100 determines whether the present SOC of the onboard battery 40, that is, the uncorrected SOC immediately before the suspension, is equal to or greater than a predetermined value. Here, the effects of polarization are larger in a region where the SOC is relatively high and smaller in a region where the SOC is relatively low. The predetermined value is set with consideration for the degree of the effects of polarization. The predetermined value corresponds to the threshold value that divides the SOC into the high SOC region where the effects of polarization are large and the low SOC region where the effects of polarization are small. The predetermined value is set to 50%, for example, but may be set to any value with consideration for the degree of the effects of polarization.

If the SOC of the onboard battery 40 is equal to or greater than the predetermined value when the condition for suspending charging is satisfied, the charge controller 100 causes the discharging to be executed and measures the voltage of the onboard battery 40 after the discharging. With this arrangement, by performing the discharging while the charging is suspended in the high SOC region where the effects of polarization are large, the measurement voltage can be corrected with certainty, and the SOC can be corrected accurately.

On the other hand, if the SOC of the onboard battery 40 is less than the predetermined value when the condition for suspending charging is satisfied, the charge controller 100 does not cause the discharging to be executed, puts the onboard battery 40 into the disconnected state, and measures the voltage of the onboard battery 40. In the low SOC region where the effects of polarization are small, the error in the SOC is relatively small, and therefore the discharging is not necessarily performed while the charging is suspended. Moreover, by not performing the discharging, a decrease in the power of the onboard battery 40 can be suppressed.

Figure 9:
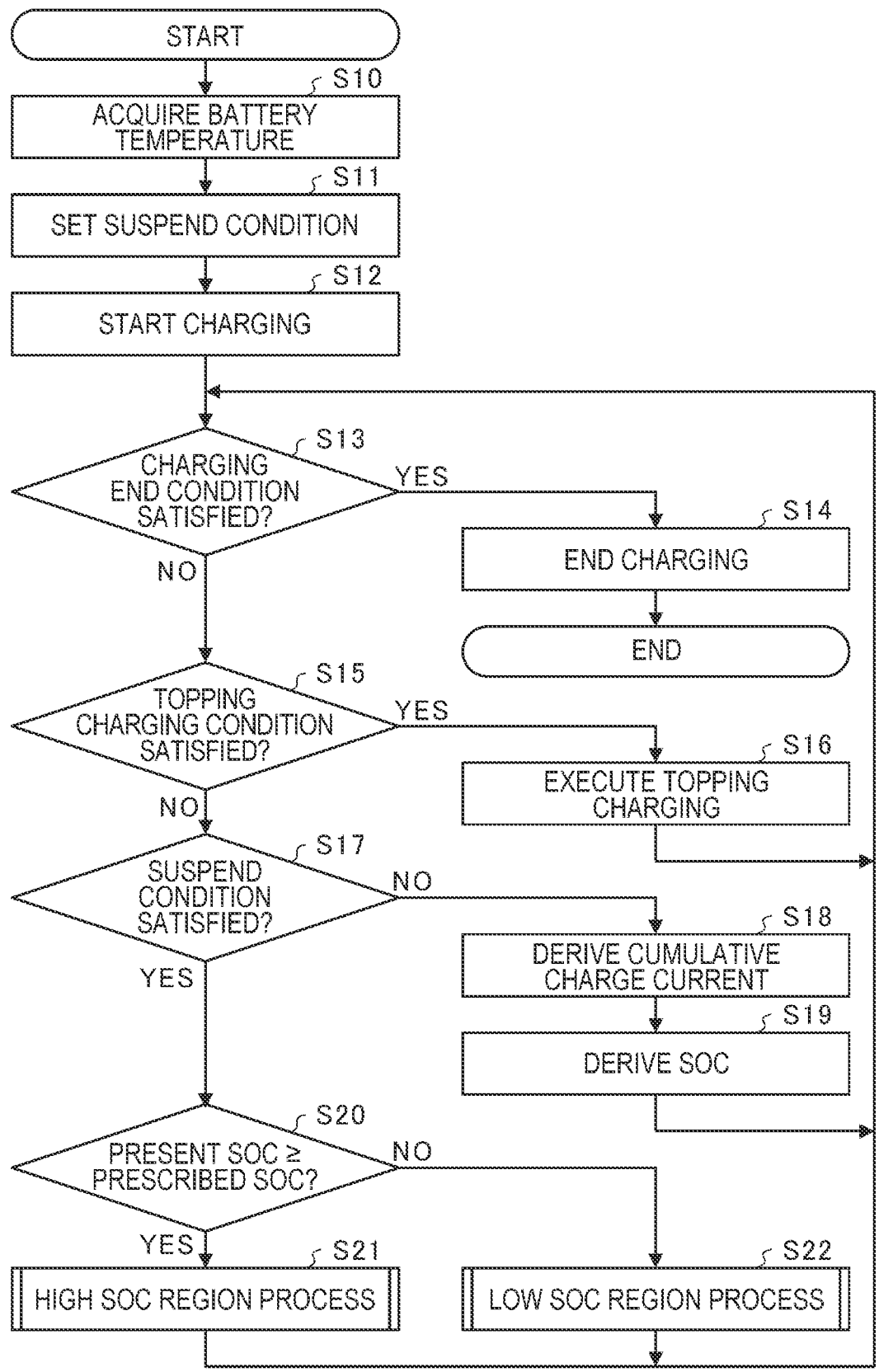
FIG. 9 is a flowchart for describing the flow of operations by a charge controller.

FIG. 9 is a flowchart for describing the flow of operations by the charge controller 100. If the charging connector 24 is coupled to the charging port 44 and an instruction for starting the charging is received, the charge controller 100 executes the series of processes illustrated in FIG. 9.

First, the charge controller 100 acquires the battery temperature at the beginning of the charging from the temperature sensor 84 (S10). Next, the charge controller 100 sets the charging suspend condition, based on the battery temperature (S11). For example, since the effects of polarization are larger at lower battery temperatures, the charge controller 100 sets a smaller target amount for the interval cumulative charge current amount with respect to a lower battery temperature. If a smaller target amount for the interval cumulative charge current amount is set, the number of suspensions increases relatively, and the measurement voltage is corrected frequently. As a consequence, by correcting the measurement voltage early, an excessive rise in the measurement voltage can be suppressed appropriately, even if the effects of polarization are large. For example, if the battery temperature is relatively high, a target amount for the interval cumulative charge current amount corresponding to an SOC of 20% is set as the suspend condition. If the battery temperature is relatively low, a target amount for the interval cumulative charge current amount corresponding to an SOC of 10% is set as the suspend condition. Note that the numerical values of the SOC indicated above as merely examples. The target amount is not limited to the above values and may be set to any value.

After the suspend condition is set (S11), the charge controller 100 switches off the second switch 52 and switches on the first switch 50 to start the charging (S12).

Next, the charge controller 100 determines whether a charging end condition is satisfied (S13). For example, the charging end condition stipulates that the measurement voltage according to the voltage sensor 80 is equal to or greater than a prescribed voltage and the topping charging executed through step S16 described later is complete. However, the charging end condition is not limited to the above example and may be set in any way.

If the charging end condition is not satisfied (S13, NO), the charge controller 100 determines whether a topping charging condition is satisfied (S15). For example, the topping charging condition stipulates that the topping charging in step S16 described later has not been executed yet and the measurement voltage according to the voltage sensor 80 has reached a prescribed voltage. However, the topping charging condition is not limited to the above example and may be set in any way. If the topping charging condition is satisfied (S15, YES), the charge controller 100 performs topping charging after putting the onboard battery 40 into the disconnected state for a predetermined time (S16). The charge controller 100 completes the topping charging when the measurement voltage according to the voltage sensor 80 is equal to or greater than a prescribed voltage. Note that the prescribed voltage in the topping charging condition may be set to the same voltage as the prescribed voltage in the charging end condition, for example. When the topping charging is complete, the charge controller 100 returns to the determination of the charging end condition (S13). Since the topping charging through step S16 is complete and the charging end condition is satisfied (S13, YES), the charge controller 100 ends the charging (S14).

If the topping charging condition is not satisfied (S15, NO), the bulk charging before the topping charging is performed, and the charge controller 100 determines whether the suspend condition set in step S11 is satisfied (S17). If the suspend condition is not satisfied (S17, NO), the charge controller 100 derives the cumulative charge current amount, based on the current measured by the current sensor 82 (S18). The charge controller 100 derives the SOC based on the derived cumulative charge current amount (S19). The charge controller 100 returns to step S13 and repeats the processes from step S13.

If the suspend condition is satisfied (S17, YES), the charge controller 100 determines whether the present SOC, that is, the SOC when the suspend condition is satisfied, is equal to or greater than a prescribed SOC (S20). The prescribed SOC is 50%, for example, but is not limited thereto.

If the present SOC is equal to or greater than the prescribed SOC (S20, YES), the charge controller 100 executes a high SOC region process (S21). The high SOC region process is a process related to suspending the charging in the region where the SOC is relatively high. The high SOC region process will be described in detail later. After executing the high SOC region process, the charge controller 100 returns to the process in step S13 and repeats the processes from step S13.

If the present SOC is less than the prescribed SOC (S20, NO), the charge controller 100 executes a low SOC region process (S22). The low SOC region process is a process related to suspending the charging in the region where the SOC is relatively low. The low SOC region process will be described in detail later. After executing the low SOC region process, the charge controller 100 returns to the process in step S13 and repeats the processes from step S13.

Figure 10:
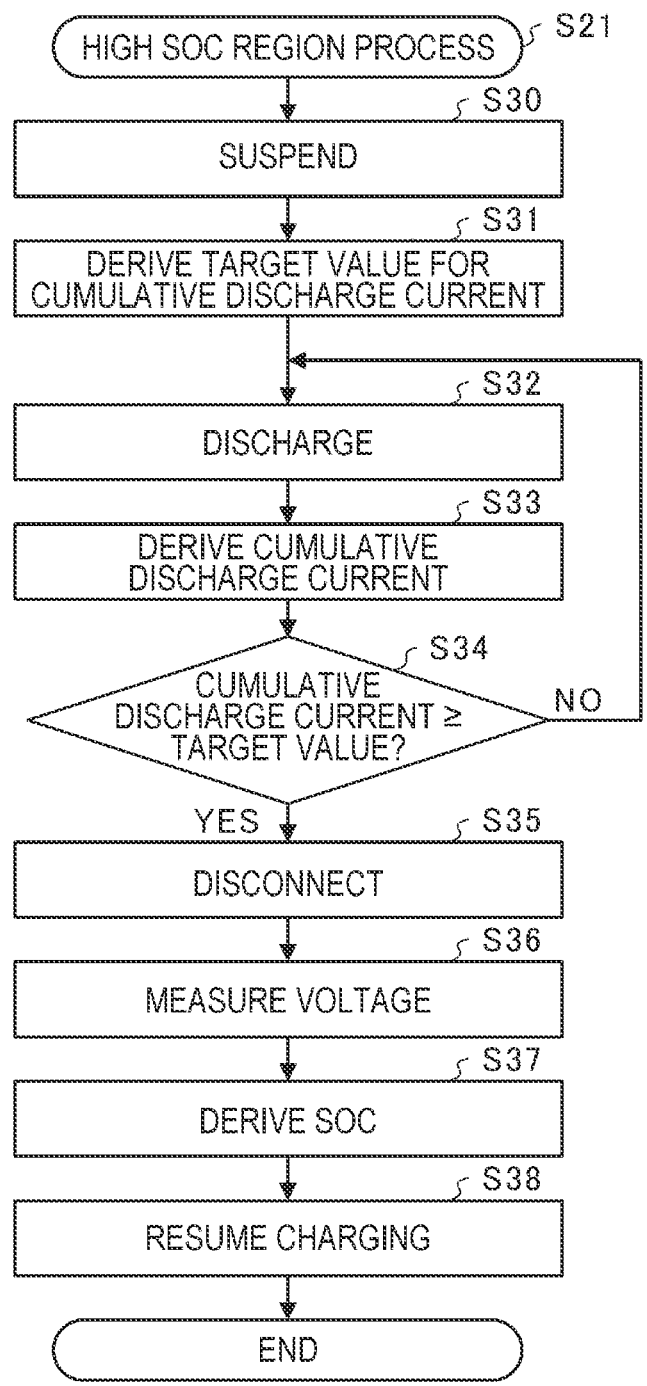
FIG. 10 is a flowchart for describing the flow of a high SOC region process.

FIG. 10 is a flowchart for describing the flow of the high SOC region process (S21). When the high SOC region process (S21) is started, the charge controller switches off the first switch 50 to suspend the charging (S30).

Next, the charge controller 100 derives a target amount for the cumulative discharge current amount, based on the interval cumulative charge current amount immediately before the suspension and the battery temperature at the beginning of the suspension (S31). For example, the charge controller 100 causes the memory 74 to store the cumulative charge current amount at the beginning of a period when there is a continuous flow of the charge current, and the cumulative charge current amount at the end of the period. The charge controller 100 subtracts the cumulative charge current amount at the beginning of the period immediately before the present suspension from the cumulative charge current amount at the end of the period immediately before the present suspension, and thereby derives the interval cumulative charge current amount immediately before the present suspension. The charge controller 100 also acquires the present battery temperature according to the temperature sensor 84 as the battery temperature at the beginning of the suspension. The charge controller 100 applies the derived interval cumulative charge current amount and the acquired battery temperature to the cumulative discharge current amount setting map to derive the target amount for the cumulative discharge current amount.

Next, the charge controller 100 switches on the second switch 52 to start the discharging (S32). With this arrangement, at least some of the power in the onboard battery 40 is discharged, and the discharged power is consumed by the electric load 60. The charge controller 100 derives the present cumulative discharge current amount due to the discharging (S33).

Next, the charge controller 100 determines whether the present cumulative discharge current amount is equal to or greater than the target amount for the cumulative discharge current amount (S34). If the present cumulative discharge current amount is less than the target amount for the cumulative discharge current amount (S34, NO), the charge controller 100 repeats the processes from step S32. In other words, the discharging continues until the present cumulative discharge current amount reaches the target amount for the cumulative discharge current amount.

If the present cumulative discharge current amount is equal to or greater than the target amount for the cumulative discharge current amount (S34, YES), the charge controller 100 switches off the second switch 52 while the first switch 50 is switched off, thereby putting the onboard battery 40 into the disconnected state (S35). With this arrangement, the discharging ends.

In the disconnected state, the charge controller 100 measures the voltage of the onboard battery 40 with the voltage sensor 80 (S36). By measuring the voltage after the discharging, the voltage is measured in a state with polarization resolved, and therefore the measurement voltage is corrected. The charge controller 100 derives the SOC based on the corrected measurement voltage (S37). Consequently, the SOC is also corrected. After deriving the SOC, the charge controller 100 resumes the charging (S38).

Figure 11:
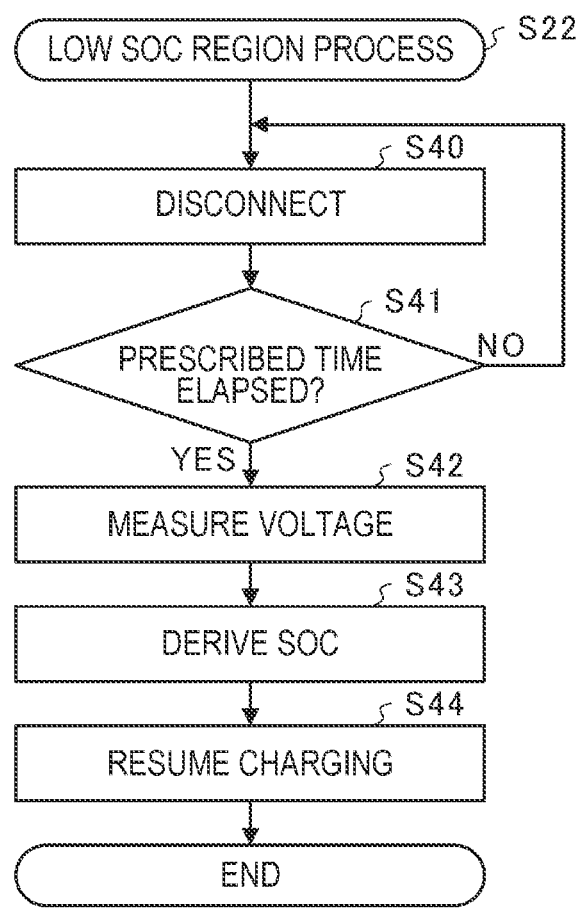
FIG. 11 is a flowchart for describing the flow of a low SOC region process.

FIG. 11 is a flowchart for describing the flow of the low SOC region process (S22). When the low SOC region process is started, the charge controller 100 switches off the first switch 50 and the second switch 52 to put the onboard battery 40 into the disconnected state (S40). The charge controller 100 determines whether a prescribed time has elapsed since the changeover from the charging state to the disconnected state (S41). The charge controller 100 maintains the disconnected state (S40) until the prescribed time elapses (S41, NO). By maintaining the disconnected state for the prescribed time, polarization is gradually resolved.

If the prescribed time elapses (S41, YES), the charge controller 100 measures the voltage of the onboard battery 40 with the voltage sensor 80 (S42). Since the voltage measurement is executed in a state of reduced polarization, error in the measurement voltage is reduced. The charge controller 100 derives the SOC based on the measured voltage (S43). Since the SOC is derived based on the measurement voltage for which the error in the measurement voltage is reduced, the error in the SOC is also reduced. After deriving the SOC, the charge controller 100 resumes the charging (S44).

As above, in the charging device 14 according to the embodiment, the charging of the onboard battery 40 is suspended at a prescribed timing, and at least some of the power in the onboard battery 40 is discharged during the suspension. With this arrangement, in the charging device 14 according to the embodiment, polarization of the onboard battery 40 is resolved early. Moreover, in the charging device 14 according to the embodiment, after the discharging, the onboard battery 40 is put into the disconnected state, the voltage of the onboard battery 40 is measured, and the SOC is derived based on the measured voltage. With this arrangement, in the charging device 14 according to the embodiment, the corrected measurement voltage is acquired in a state with polarization resolved, and as a result, a corrected SOC is derived.

Consequently, according to the charging device 14 according to the embodiment, error in the SOC during charging can be reduced.

The above describes an embodiment of the present disclosure with reference to the accompanying drawings, but obviously the present disclosure is not limited to such an embodiment. It is clear that a person skilled in the art could conceive of various modifications or alterations within the scope of the claims, and any such modifications or alterations are naturally understood to also be within the technical scope of the present disclosure.

For example, in the embodiment above, the power discharged from the onboard battery 40 is consumed by the electric load 60 inside the vehicle 12. However, when discharging, the voltage on the power supply equipment 10 side may be set lower than the voltage of the onboard battery 40, and the power discharged from the onboard battery 40 may be supplied to the power supply equipment 10 side. In this case, the power supplied to the power supply equipment 10 side may be consumed by electric equipment inside the power supply equipment 10 or supplied to the electric power system 26.

Also, after the discharging, the charge controller 100 according to the embodiment above puts the onboard battery 40 into a no-load state and measures the voltage of the onboard battery 40 in the no-load state. However, after the discharging, the charge controller 100 may also resume the charging without putting the onboard battery 40 into a no-load state, and measure the voltage of the onboard battery 40 while the onboard battery 40 is in a connected state. For example, since little or no pseudopotential difference occurs immediately after resuming the charging, the measurement voltage in the connected state immediately after resuming the charging is corrected with respect to the measurement voltage immediately before the discharging. However, the effects of polarization increase as time elapses from the resuming of the charging. For this reason, in some embodiments, a configuration that puts the onboard battery 40 into a no-load state after the discharging and measures the voltage of the onboard battery 40 in the no-load state may be adopted in place of a configuration that measures the voltage of the onboard battery 40 after the charging is resumed.

The control device 70 illustrated in FIG. 8 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 70 including the charge controller 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 8.

The invention claimed is:

1. A charging device to be applied to a vehicle, the charging device comprising:
 a charging port configured to be electrically coupled to a power source external to the vehicle;
 an onboard battery configured to be electrically coupled to the charging port; and
 a control device configured to perform charging of the onboard battery with power to be supplied through the charging port, wherein the control device comprises:
 one or more processors; and
 one or more memories coupled to the one or more processors; and
 the one or more processors are configured to execute a process comprising:
 suspending the charging of the onboard battery at a prescribed timing during the charging of the onboard battery;
 discharging at least some of the power in the onboard battery from the onboard battery when the charging of the onboard battery is suspended;

measuring a voltage of the onboard battery after the discharging of the onboard battery;

deriving a state of charge of the onboard battery, based on the measured voltage of the onboard battery, wherein the one or more processors are configured to execute a process comprising:

deriving, based on a cumulative charge current amount obtained by accumulating charge current values of the onboard battery over time and a temperature at a beginning of the discharging of the onboard battery, a target amount for a cumulative discharge current amount obtained by accumulating discharge current values of the onboard battery over time; and causing the discharging to be executed such that an actual cumulative discharge current amount due to the discharging is equal to or greater than the derived target amount for the cumulative discharge current amount.

2. The charging device according to claim 1, wherein the one or more processors are configured to execute a process comprising:

setting the prescribed timing for suspending the charging of the onboard battery, based on a temperature at a beginning of the charging of the onboard battery.

3. The charging device according to claim 1, wherein the one or more processors are configured to execute a process comprising:

deriving the state of charge of the onboard battery, based on the cumulative charge current amount obtained by accumulating charge current values of the onboard battery over time during the charging of the onboard battery;

in a case where the state of charge of the onboard battery is equal to or greater than a predetermined threshold value when a condition for suspending charging is satisfied, executing the discharging, and measuring the voltage of the onboard battery after the discharging; and in a case where the state of charge of the onboard battery is less than the predetermined threshold value when the condition for suspending charging is satisfied, not executing the discharging, putting the onboard battery into a disconnected state, and measuring the voltage of the onboard battery.

4. The charging device according to claim 2, wherein the one or more processors are configured to execute a process comprising:

deriving the state of charge of the onboard battery, based on the cumulative charge current amount obtained by accumulating charge current values of the onboard battery over time during the charging of the onboard battery;

in a case where the state of charge of the onboard battery is equal to or greater than a predetermined threshold value when a condition for suspending charging is satisfied, executing the discharging, and measuring the voltage of the onboard battery after the discharging; and in a case where the state of charge of the onboard battery is less than the predetermined threshold value when the condition for suspending charging is satisfied, not executing the discharging, putting the onboard battery into a disconnected state, and measuring the voltage of the onboard battery.

* * * * *